United States Patent [19]
Kuo-Tai

[11] Patent Number: 5,895,187
[45] Date of Patent: Apr. 20, 1999

[54] PILOT SCREW

[76] Inventor: Hsu Kuo-Tai, No. 70, Alley299, Lane 12, Sec.II Chang-Ho Street, Tainan City, Taiwan

[21] Appl. No.: 08/922,639

[22] Filed: Sep. 3, 1997

[51] Int. Cl.⁶ .................. F16B 25/00; F16B 35/06
[52] U.S. Cl. .................. 411/386; 411/311; 411/399; 411/418
[58] Field of Search ................ 411/309, 310, 411/311, 386, 412, 413, 418, 399, 387, 420

[56] References Cited

U.S. PATENT DOCUMENTS

| | | | |
|---|---|---|---|
| 234,759 | 11/1880 | Eckford | 411/399 |
| 465,101 | 12/1891 | Richards | 411/399 |
| 2,263,137 | 11/1941 | Oestereicher | 411/311 X |
| 5,088,869 | 2/1992 | Greenslade | 411/386 |
| 5,133,630 | 7/1992 | Hughes | 411/311 X |
| 5,273,383 | 12/1993 | Hughes | 411/311 |

*Primary Examiner*—Neill Wilson
*Attorney, Agent, or Firm*—Dougherty & Troxell

[57] ABSTRACT

A pilot screw has a head, a shank beneath the head, a tapered tip at the end of the shank, and a spiral thread surrounding the shank. A large number of spaced auxiliary threads are disposed on the tapered portion of the head. A large number of spaced secondary threads are disposed on the shank between the pitches, and plural cutting gaps are formed at the end area of the spiral thread.

9 Claims, 5 Drawing Sheets

PILOT SCREW

BACKGROUND OF THE INVENTION

This invention relates to a pilot screw. More particularly, the invention relates to a pilot screw with small torsion, excellent leading and excellent balance.

Referring to FIG. 1, a conventional screw has a head 10, a shank 11, a spiral thread 12, and tapered cutting surfaces 13 at the end of the shank 11 can drill a hole also. However, it is very difficult to form cutting surfaces on the thread. Since the strength of the screw is reduced while the cutting surfaces are formed thereon, the quality of the screw is worsened.

SUMMARY OF THE INVENTION

An object of the invention is to provide a pilot screw which has small torsion.

Another object of the invention is to provide a pilot screw which can be directed toward the predetermined direction precisely.

Another object of the invention is to provide a pilot screw which has a tapered cutting surface at the end of a shank in order to drill a hole easily.

Another object of the invention is to provide a pilot screw which can facilitate the steady operation of the pilot screw.

Yet another object of the invention is to provide a pilot screw which can be manufactured without reducing the strength of the screw significantly.

According to one embodiment of the invention, a pilot screw has a head, a shank beneath the head, and a spiral thread surrounding the shank. A large number of spaced auxiliary threads are disposed on the tapered portion of the head. A large number of spaced secondary threads are disposed on the shank between the pitches. An included angle is formed between the secondary thread and the crest of the spiral thread. The spiral thread defines a large number of pitches.

According to another embodiment of the invention, each crest of the secondary threads of the shank has two included angles. Each auxiliary thread extends to the upper edge of the head. Each auxiliary thread has two included angles. Thus, the auxiliary threads can cut the edge of the hole very fast.

DETAILED DESCRIPTION OF THE INVENTION

Figure 1:
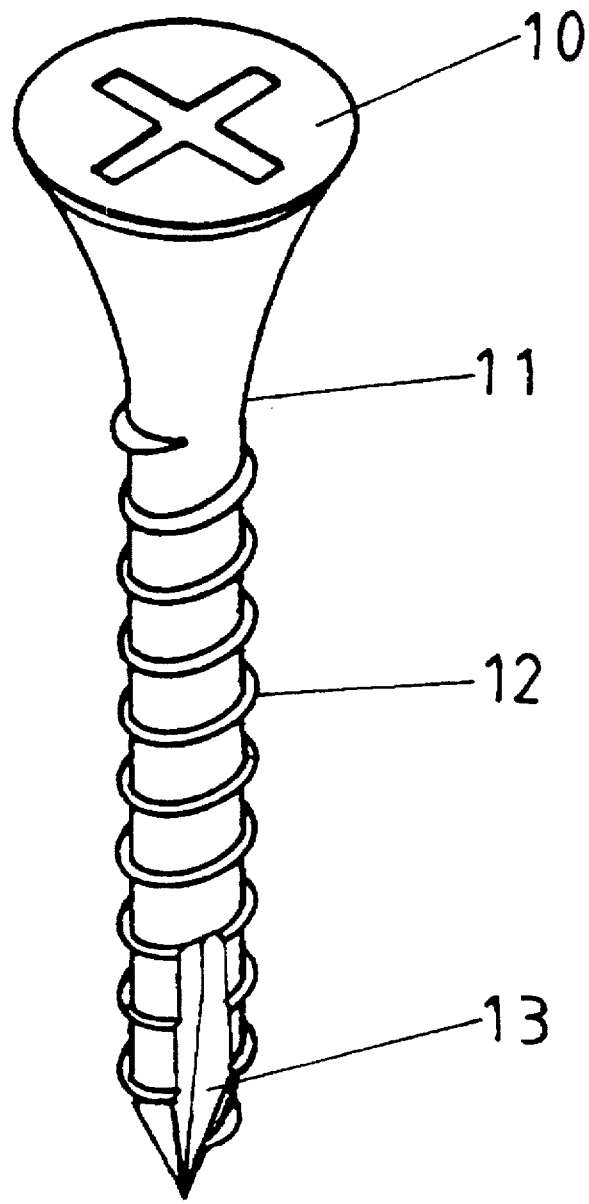
FIG. 1 is a perspective view of a screw of the prior art.
Figure 2:
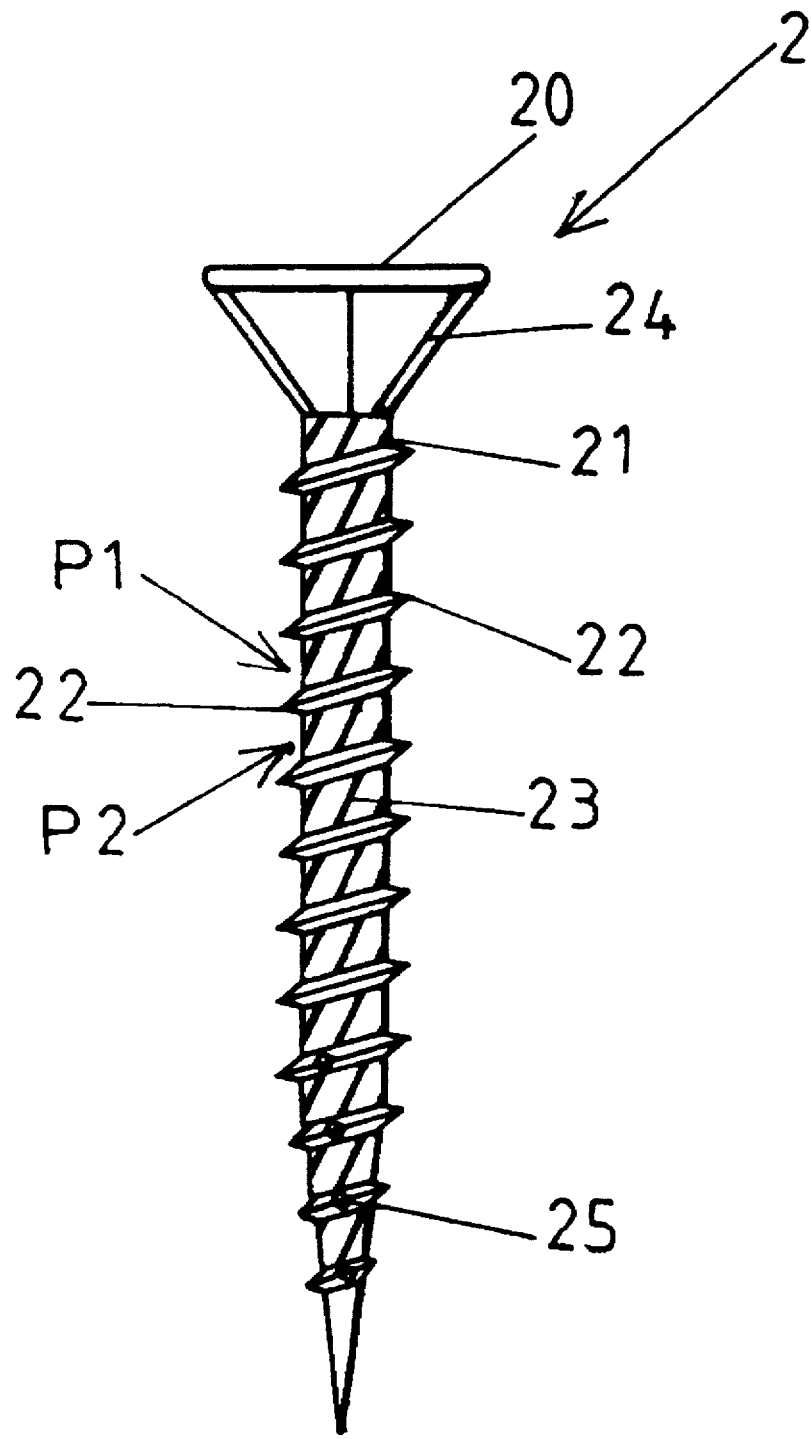
FIG. 2 is a front elevational view of a pilot screw of a preferred embodiment in accordance with the invention.
Figure 3:
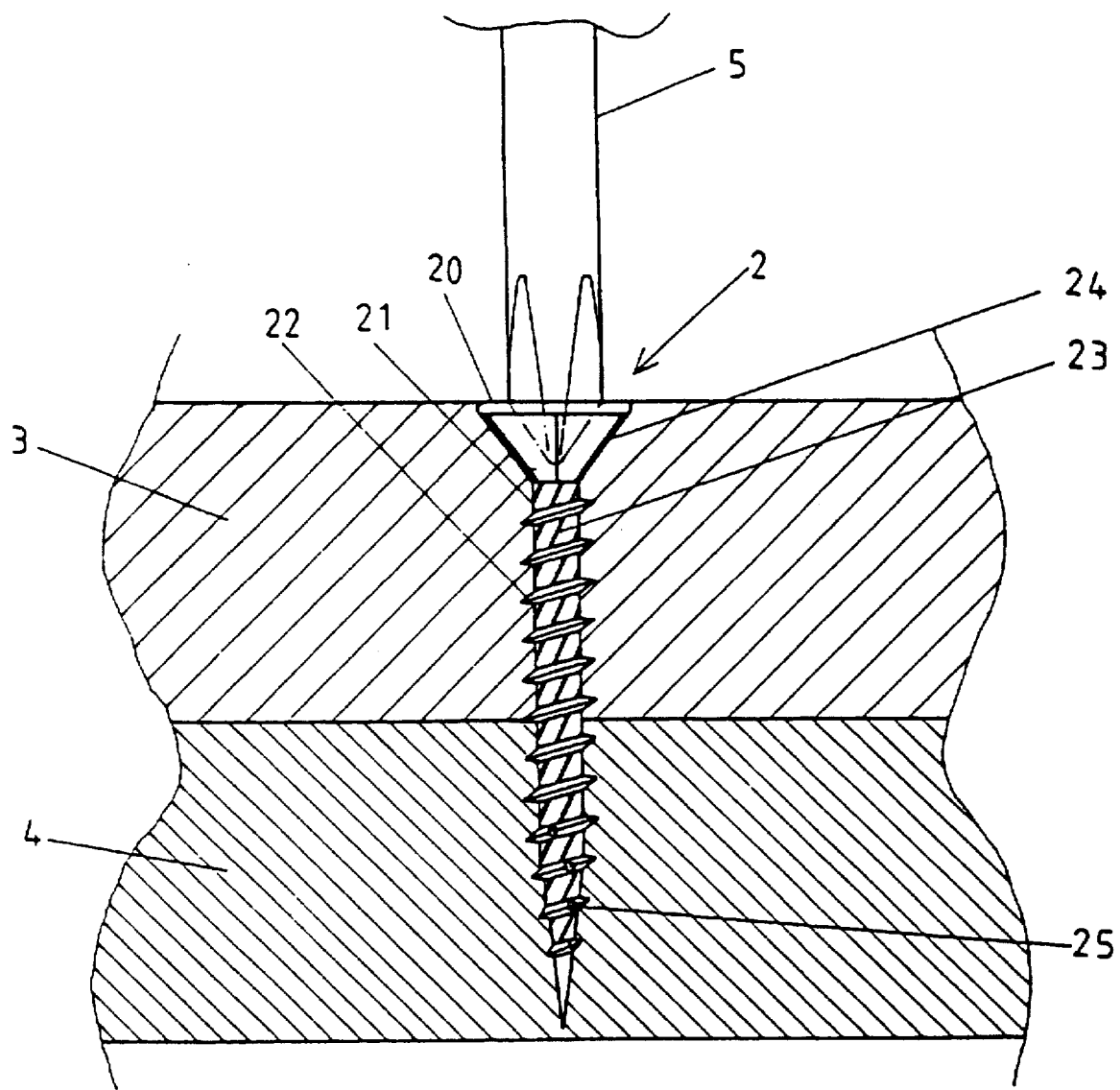
FIG. 3 is a schematic view illustrating the operation of a pilot screw.

Referring to FIGS. 2 and 3, a pilot screw 2 has a head 20, a shank 21 beneath the head 20, a tapered cutting surface 25 at the end of the shank 21, and a spiral thread 22 surrounding the shank 21. A large number of spaced secondary threads 23 are disposed on the shank 21 between pitches P. An included angle is formed between the secondary thread 23 and the crest of the spiral thread 22. The auxiliary threads 24 and the secondary threads 23 facilitate the operation of the pilot screw 2 and provide small torsion, excellent leading and excellent balance for the pilot screw 2. The cutting gap 25 at the end area of the spiral thread 22 can drill and cut a hole easily. The cutting gap 25 just like V-shaped gap, it can touch articles 3, 4 and help cutting and drilling a hole substantially.

Referring to FIG. 3, the head 20 is pressed down with a screw driver 5. Thus the pilot screw 2 can be driven very fast with the screw driver 5.

Figure 4:
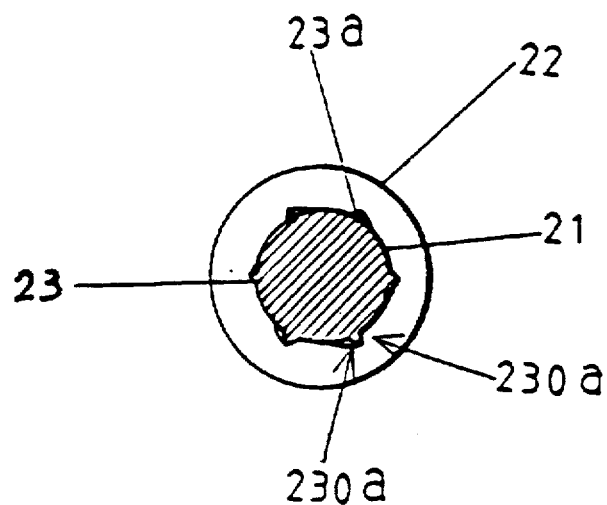
FIG. 4 is a cross-sectional view of a shank of a pilot screw of a preferred embodiment.

Referring to FIG. 4, each side 23a of the crest of the secondary threads 23 and the shank 21 form equal included angles 230a. Thus the crests of the secondary threads 23 can cut the edge of the hole very fast.

Figure 6:
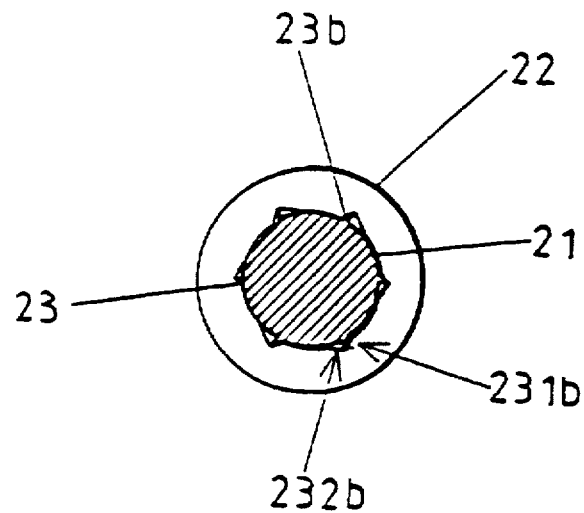
FIG. 6 is a cross-sectional view of a shank of a pilot screw of another preferred embodiment.

Referring to FIG. 6, each side 23b of the crest of the secondary threads 23 and the shank 21 form first and second included angles 231b and 232b. The second included angle 232b is smaller than the first included angle 231b. Thus the crests of the secondary threads 23 can cut the edge of the hole very fast.

Figure 5:
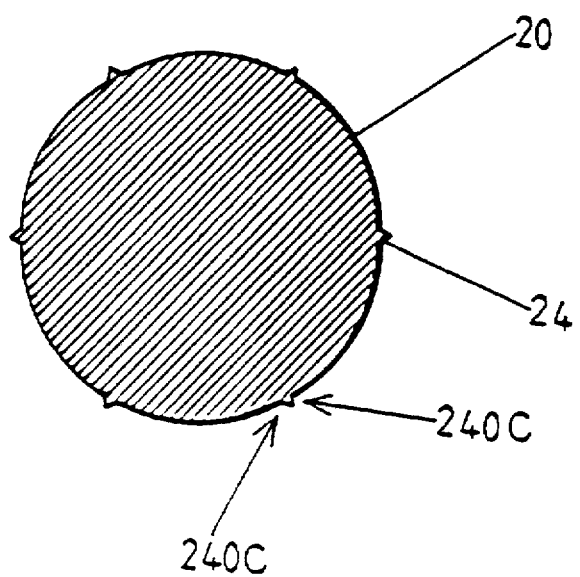
FIG. 5 is a cross-sectional view of a head of a pilot screw of a preferred embodiment.
Figure 7:
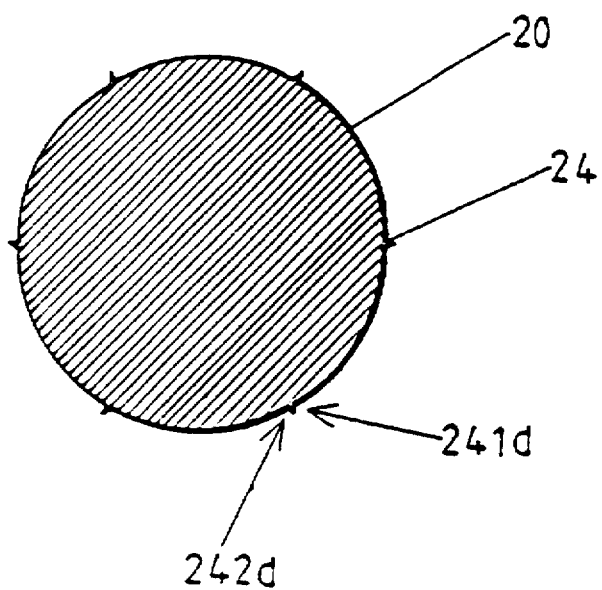
FIG. 7 is a cross-sectional view of a head of a pilot screw of another preferred embodiment.

Referring to FIG. 5, each auxiliary thread 24 extends to the upper edge of the head 20. In FIG. 7, each side 24d of auxiliary thread 24 forms first and the second included angles 241d and 242d with the side of head 20. The second included angle 242d is smaller than the first included angle 241d. Thus the auxiliary threads 24 can cut the edge of the hole very fast.

Referring to FIG. 3, the head 20 is pressed down with a screw driver 5. The tapered cutting surface 25 at the end of the shank 21 touches article 3, 4 and drills a hole therein. The secondary threads 23 reduces the torsion of the pilot screw 2. The secondary threads 23 leads the pilot screw 2 toward the predetermined direction precisely. The auxiliary threads 24 reduces the torsion of the pilot screw 2 also.

The present invention has the following advantages.

The pilot screw can maintain its strength while manufacturing. The tapered cutting surface, the secondary threads, and the auxiliary threads can be formed on the pilot screw without reducing the strength of the pilot screw significantly. Further, the quality of the pilot screw is significantly increased.

The asymmetrical angles of the first and second included angles of the head facilitate the operation of the pilot screw. The tapered portion of the head can enter the interior of the hole. Thus the head can be level with the surface of the article. Further, the tightened pilot screw will not be loosened at all.

The auxiliary threads can help the tapered portion of the head to enter the interior of the hole without cracking the surface of the article. Thus the surface of the article will not be damaged.

The secondary threads and the auxiliary threads reduce the torsion of the pilot screw significantly. Thus the pilot screw can facilitate user operation. The user can operate the pilot screw steadily. The pilot screw can be directed toward the predetermined directly precisely.

It is an option to form the second included angle 232b approaching 90°. It is another option to form the second included angle 242d approaching 90° also. Thus the strength of the pilot screw can be increased and the cutting speed of the pilot screw can be accelerated.

The invention is not limited to the above embodiments but various modification thereof may be made. It will be understood by those skilled in the art that various changes in form and detail may be made without departing from the scope of the invention.

What is claimed is:

1. A pilot screw comprising:
   a) a head;
   b) an elongated shank extending from the head, the shank having a distal end portion and a spiral thread formed thereon forming a plurality of pitches between axially adjacent portions of the spiral thread;
   c) a plurality of cutting gaps formed in a periphery of the spiral thread located adjacent to the distal end portion of the shank; and,
   d) a plurality of spaced secondary threads, each comprising a generally axially extending rib protruding from the shank and located in the plurality of pitches between axially adjacent portions of the spiral thread.

2. The pilot screw of claim 1 wherein each of the ribs has two opposite sides, each side forming a substantially equal angle with a surface of the shaft.

3. The pilot screw of claim 1 wherein each of the ribs has first and second sides forming first and second angles respectively with a surface of the shaft wherein the first and second angles are different from each other.

4. The pilot screw of claim 1 wherein the cutting gaps have V-shaped configurations.

5. A pilot screw comprising:
   a) a head having a tapered underside;
   b) an elongated shank extending from the tapered underside of the head, the shank having a distal and portion and a spiral thread formed thereon forming a plurality of pitches between axially adjacent portions of the spiral thread;
   c) a plurality of cutting gaps formed in a periphery of the spiral thread located adjacent to the distal end portion of the shank;
   d) a plurality of spaced secondary threads, each comprising a generally axially extending first rib protruding from the shank and located in the plurality of pitches between axially adjacent portions of the spiral thread; and,
   e) a plurality of spaced auxiliary threads, each comprising a generally axially extending second rib protruding from the tapered underside of the head.

6. The pilot screw of claim 5 wherein each second rib extends to an upper edge of the head.

7. The pilot screw of claim 5 wherein each of the second ribs has two opposite sides, each side forming a substantially equal angle with the tapered underside of the head.

8. The pilot screw of claim 5 wherein each second rib has first and second sides forming first and second angles, respectively, with the tapered underside of the head wherein the first and second angles are different from each other.

9. The pilot screw of claim 5 wherein the cutting gaps have V-shaped configurations.

* * * * *